(12) United States Patent
Lindoff et al.

(10) Patent No.: US 8,081,561 B2
(45) Date of Patent: Dec. 20, 2011

(54) SIGNAL GENERATING UNIT AND SIGNAL RECEIVING UNIT

(75) Inventors: Bengt Lindoff, Bjärred (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 12/096,606

(22) PCT Filed: Dec. 14, 2006

(86) PCT No.: PCT/EP2006/069727
§ 371 (c)(1),
(2), (4) Date: Jun. 8, 2008

(87) PCT Pub. No.: WO2007/068742
PCT Pub. Date: Jun. 21, 2007

(65) Prior Publication Data
US 2008/0304405 A1    Dec. 11, 2008

Related U.S. Application Data

(60) Provisional application No. 60/750,582, filed on Dec. 15, 2005.

(30) Foreign Application Priority Data

Dec. 14, 2005    (EP) .................................... 05112114

(51) Int. Cl.
*H04J 11/00*    (2006.01)

(52) U.S. Cl. ........................ 370/210; 370/203
(58) Field of Classification Search .................. 370/203
See application file for complete search history.

(56) References Cited

U.S. PATENT DOCUMENTS

| 6,175,551 | B1 * | 1/2001 | Awater et al. ............... 370/210 |
| 7,477,879 | B1 * | 1/2009 | Ganti et al. .................. 455/88 |
| 2007/0129031 | A1 * | 6/2007 | Newton et al. ............. 455/127.2 |

OTHER PUBLICATIONS

Dan Zhang, Pingyi fan and Zhigang cao, Interference Cancellation for OFDM systems in presence of overlapped narrow band transmission system, Feb. 2004,IEEE, vol. 50, pp. 108-113.*

Interferance cancellation for OFDM systems in presence of overlapping Narrow Band Transmission System, IEEE, pp. 108-113, vol. 50, Feb. 2004.*

* cited by examiner

*Primary Examiner* — Derrick Ferris
*Assistant Examiner* — Maharishi Khirodhar
(74) *Attorney, Agent, or Firm* — Potomac Patent Group PLLC

(57) ABSTRACT

A signal generating unit (100) is provided for generating signals. The signal generating unit comprises an IFFT unit (101) for generating an output signal; a filter unit (102) operatively connected to the IFFT unit; and a subtractor (103) operatively connected to the IFFT unit and to the filter unit, said subtractor being adapted to subtract the interference from the output signal. A signal receiving unit (200, 300) is provided for receiving signals. The signal generating unit comprises a filter unit (202, 302); a subtractor (203, 303) operatively connected to the filter unit; and an FFT unit (201, 301) operatively connected to the subtractor. Methods for receiving and generating signals are also provided.

20 Claims, 3 Drawing Sheets

SIGNAL GENERATING UNIT AND SIGNAL RECEIVING UNIT

TECHNICAL FIELD OF THE INVENTION

The present invention relates to a signal generating unit a signal receiving unit, a method for generating signals and a method for receiving signals.

DESCRIPTION OF RELATED ART

OFDM (Orthogonal Frequency Division Multiplex) is an access technique for high-rate wireless applications. For example, OFDM is used in different versions of WLAN (Wireless Local Area Network), such as IEEE 802.11a and g, and different standards for broadcasting, like DVB-T (Digital Video Broadcast-Terrestrial), DVB-H (DVB Handheld), and DAB (Digital Audio Broadcast). One advantage with OFDM is the possibility to do down-link multiple access in a cellular system in a simple way, by allocating different users to different sub carriers. Another advantage with OFDM is the possibility to disable sub carriers not used, i.e., nulling of one or several groups of sub carriers.

Disabling of sub carriers could be used for overlaying of a wideband system, such as OFDM, with a narrowband system, such as GSM (Global System for Mobile communication). That is, the two systems are using overlapping frequency bands, but the spectrum of the wideband system is shaped for minimum interference with the narrowband system. The possibility for this kind of overlay simplifies the introduction of a new high-rate wideband system in a frequency spectrum already used by a low-rate narrowband system.

One example where overlapping frequency bands are envisioned to be useful is in the evolution of a wideband system in existing 2G (GSM) frequency spectrum. GSM is a frequency hopping TDMA (Time Division Multiple Access) communication system where the frequency hopping is introduced for improving the frequency diversity as well as average out the interference level. By disabling groups of carriers in the GSM system it is possible to make room for a wideband OFDM communication system, which may operate simultaneously with the GSM system.

Another example where overlapping frequency bands can be envisioned to be beneficial is when a WLAN system, e.g., based on IEEE 802.11g is co-located with a system adapted according to the Bluetooth standard. Both systems are operating in the unlicensed ISM (Industrial Scientific Medical) band around 2.45 GHz, which is only about 80 MHz wide. Therefore, this kind of overlay could be useful for co-locating a Bluetooth system and a WLAN system. Currently, co-existence in the 2.45 GHz band between WLAN based on 802.11b and Bluetooth is based on time-sharing of the medium, either through AWMA (Alternating Wireless Medium Access) or through PTA (Packet Traffic Arbitration).

Introducing a wideband system as described above, i.e., by basically reducing the bandwidth originally intended for the narrowband system is a problem, since the performance of the existing system in this way might be severely degraded. Rather, to allow for a more flexible means of co-existence, it is beneficial if the wideband system and the narrowband system can use overlapping frequencies by ensuring that the wideband system is reducing its output power at the frequencies used by the narrowband system. In this way an almost ideal overlay situation would be the result, i.e., a situation where the wideband system is introduced and the performance for the narrowband system is virtually unaffected. In case the wideband system is based on OFDM, a natural approach to achieve this is based on simply not transmitting anything on those sub carriers that are using the same frequencies as the narrowband system.

It has been found that the straightforward solution to disable sub carriers of the wideband system over only the bandwidth used for the narrowband system is not sufficient. The reason for this is the fact that a substantial leakage may be experienced both in the IFFT at the transmitter side and in the FFT at the receiver side for an OFDM system. This leakage has the effect that interference between the systems will not be reduced as much as desired.

The leakage at the transmitter (TX) side will cause interference from the wideband system to the narrowband system in any frequency range where sub carriers for the wideband system have been disabled. The leakage at the receiver (RX) side will imply that the wideband system will experience interference from the narrowband system from signals transmitted in the frequency range, wherein the sub carriers have been disabled in the frequency band of the wideband system.

One solution to reduce the leakage is to null a number of sub carriers of the wideband system, which corresponds to a bandwidth in excess of that used by the narrowband system. Taking GSM as an example, one could e.g. create a 0.5 MHz hole or frequency range in the wideband system for each 200 kHz GSM carrier. The drawback with this approach is that it will severely degrade the spectrum efficiency since it means that part of the spectrum will not be used at all, but will only serve as guard band between the two systems. Another solution to reduce the leakage is to introduce a pulse shaped OFDM. However, the problem with pulse shaped OFDM solution is that it in general requires more complex channel estimation procedures and equalizers to cope with e.g. inter symbol interference, whereby the signal processing complexity in the terminal is increased.

SUMMARY OF THE INVENTION

According to a first embodiment, a signal generating unit for generating signals within a predetermined frequency band of a first communication system, wherein the signal generating unit is adapted to at least temporarily disable carrier frequencies within at least one frequency range, which is located within the predetermined frequency band and which is provided for a second communication system, comprises an IFFT unit for generating an output signal; a filter unit operatively connected to the IFFT unit, said filter unit being adapted to filter out interference, which is located at said frequency range, from the output signal; and a subtractor operatively connected to the IFFT unit and to the filter unit, said subtractor being adapted to subtract the interference from the output signal.

The filter unit may be a controllable filter unit, which is controllable in dependence on carrier frequencies allocated in said frequency range by the second communication system.

The filter unit may be controllable in dependence on the relative strength of signals generated by the signal generating unit and signals generated by the second communication system within the frequency range.

The filter unit may be controllable in dependence on the number of carrier frequencies for the second communication system within the frequency range.

The filter unit may comprise a first mixer operatively connected to the IFFT unit, an LP filter operatively connected to the first mixer, and a second mixer operatively connected to the filter unit. The first mixer may be adapted to down-convert the output signal, which has a certain frequency, to DC. The LP filter may be adapted to LP filter the down-converted signal. The second mixer may be adapted to up-convert the LP filtered signal to said certain frequency.

The signal generating unit may comprise an equalizer operatively connected to the IFFT unit. The equalizer may be adapted to amplify certain frequencies of the signals, which are generated by the signal generating unit and which are effected by the filter unit, with an equalizer function $E(f_k)=1/(1-H(f_k))$.

According to a second embodiment, a signal receiving unit for receiving signals within a predetermined frequency band of a first communication system, said frequency band including a frequency range, in which carrier frequencies for the first communication system are at least temporarily disabled, which is located within the predetermined frequency band, and which is provided for a second communication system, comprises a filter unit adapted to filter out interference, which is located at said frequency range, from a received signal; a subtractor operatively connected to the filter unit, said subtractor being adapted to subtract the interference from the received signal; and an FFT unit operatively connected to the subtractor and being located after the subtractor in a receiver path of the signal receiving unit.

The filter unit of the signal receiving unit may be a controllable filter unit, which is controllable in dependence on carrier frequencies allocated in said frequency range by the second communication system.

The filter unit of the signal receiving unit may be controllable in dependence on the bandwidth of the frequency range.

The signal receiving unit may comprise a QAM detector, which is adapted to obtain carriers within the frequency band, and an SNR estimator adapted to generate an SNR value for each obtained carrier, wherein the filter unit is controllable in dependence on any generated SNR value.

The signal receiving unit may comprise a signal power estimator, which is adapted to integrate the signal power over the frequency range, wherein the filter unit is controllable in dependence on the integrated signal power.

The signal generating unit may be arranged together with the signal receiving unit, and vice versa.

According to a third embodiment, a method for generating signals within a predetermined frequency band of a first communication system, wherein the predetermined frequency band includes disabled carrier frequencies within at least one frequency range, which is located within the predetermined frequency band and which is provided for a second communication system, comprises generating an IFFT processed output signal; filtering the IFFT processed output signal to filter out interference, which is located at said frequency range, from the IFFT processed output signal; and subtracting the interference from the IFFT processed signal.

The method for generating signals may comprise controlling the filtering in dependence on carrier frequencies allocated in said frequency range by the second communication system.

The method for generating signals may comprise controlling the filtering in dependence on the relative strength of signals generated in the predetermined frequency band and signals generated within the frequency range.

The method for generating signals may comprise controlling the filtering in dependence on the number of carrier frequencies for the second communication system within the frequency range.

The filtering may comprise down converting the IFFT processed output signal, which has a certain frequency, to DC, LP filtering the down-converted signal, and up converting the LP filtered signal to said certain frequency.

The method for generating signals may comprise amplifying certain signals to be IFFT processed, which will be effected by said filtering, with an function $E(f_k)=1/(1-H(f_k))$.

According to a fourth embodiment, a method for receiving signals within a predetermined frequency band of a first communication system, said frequency band including a frequency range for a second communication system, in which carrier frequencies for the first communication system that are located within the predetermined frequency band are at least temporarily disabled, comprises filtering out interference, which is located at said frequency range, from a received signal; subtracting the interference from the received signal; and FFT processing the received signal after the interference has been subtracted.

The method for receiving signals may comprise controlling the filtering in dependence on carrier frequencies allocated in said frequency range for the second communication system.

The method for receiving signals may comprise controlling the filtering in dependence on the bandwidth of the frequency range.

The method for receiving signals may comprise obtaining carriers within the frequency band, generating an SNR value for each obtained carrier, and controlling the filtering in dependence on any generated SNR value.

The method for receiving signals may comprise integrating the signal power over the frequency range, and controlling filtering in dependence on the integrated signal power.

According to a fifth embodiment, a computer program product comprises computer program code means for executing the method for generating signals when said computer program code means are run by an electronic device having computer capabilities.

According to a sixth embodiment, a computer readable medium has stored thereon a computer program product comprising computer program code means for executing the method for generating signals when said computer program code means are run by an electronic device having computer capabilities.

According to a seventh embodiment, a computer program product comprises computer program code means for executing the method for receiving signals when said computer program code means are run by an electronic device having computer capabilities.

According to an eighth embodiment, a computer readable medium has stored thereon a computer program product comprising computer program code means for executing the method for receiving signals when said computer program code means are run by an electronic device having computer capabilities. Further embodiments of the invention are defined in the dependent claims.

Some embodiments of the invention provides a signal generating unit and a signal receiving unit having increased efficiency.

Embodiments of the invention allows for interference generated within the frequency range to be reduced. Thus, the frequency range may be made narrower than compared to a prior art system. Consequently, the efficiency of the signal generating unit and the signal receiving unit may be improved, e.g. by the improved frequency usage.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which.

DETAILED DESCRIPTION OF EMBODIMENTS

In order to ease the description of embodiments of the invention, it will be described with reference to a wideband OFDM system and a narrowband GSM system. However, the invention is not restricted to this application, but is applicable to any wideband system, such as an OFDM system according to any of the IEEE 802.11a or g or 802.16 standards or a UWB (Ultra Wide-Band) system, that is supposed to co-exist with a narrowband system, such as a GSM system or a Bluetooth system.

In embodiments of the invention, filter units are provided both in the signal generating unit and in the signal receiving unit to filter out interference at a frequency range, which provides a hole where GSM carriers may be located, within a frequency band for the OFDM system. In the OFDM system, sub carriers are disabled in the frequency range. The interference filtered out is subtracted from a signal to be transmitted/ that has been received.

In the signal generating unit, the interference may be spectral leakage generated in an IFFT (Inverse Fast Fourier Transform) process. In the signal receiving unit, the interference may be GSM interferers located in the frequency range. By using the filter unit in the signal generating unit, the OFDM spectral leakage in the created frequency range used for GSM carriers could easily be reduced by 10-20 dB, improving the GSM to OFDM co-channel interference ratio in the GSM receiver. The filter unit in the signal receiving unit significantly improves the OFDM to GSM selectivity in terms of that the number of OFDM carriers affected by the spectral leakage of the GSM carrier is significantly reduced.

Figure 1:
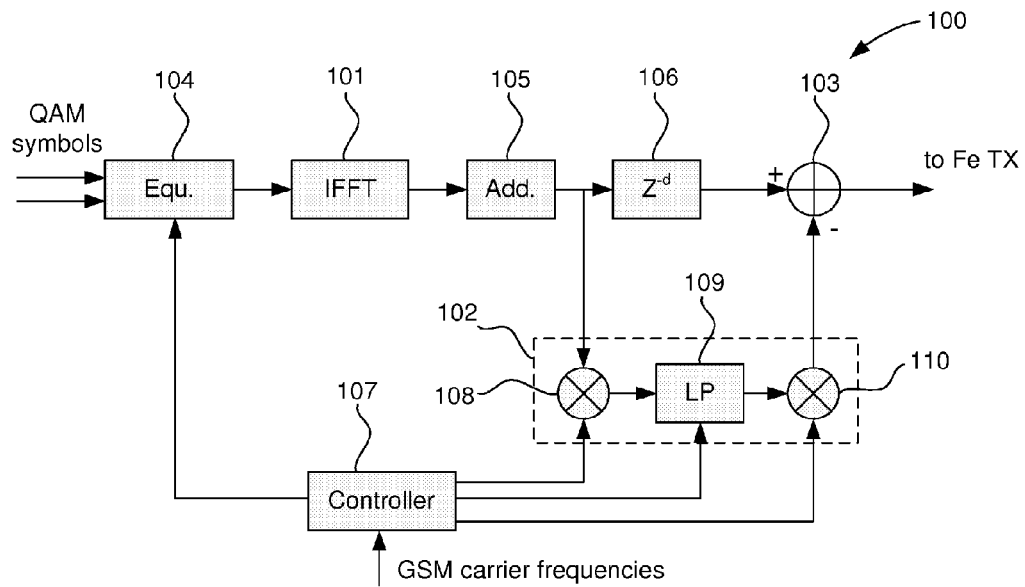
FIG. 1 is a block diagram of an embodiment of a signal generating unit.

FIG. 1 illustrates an embodiment of the signal generating unit 100. The signal generating unit 100 comprises an IFFT unit 101, a filter unit 102, and a subtractor 103. The signal generating unit 100 may also comprise an equalizer 104, an adding unit 105, a delay unit ($z^{-d}$) 106, and a controller 107.

The equalizer 104 may be operatively connected to a symbol generator (not shown). The symbol generator may be adapted to generate QAM (Quadrature Amplitude Modulation) symbols, which are supplied as input signals to the equalizer 104. The equalizer 104 is also operatively connected to the IFFT unit 101. An output terminal of the equalizer 104 may be connected to an input terminal of the IFFT unit 101. The IFFT unit 101 is operatively connected to the adding unit 105. An output terminal of the IFFT unit 101 may be connected to an input terminal of the adding unit 105. The adding unit 105 is operatively connected to the delay unit 106 and the filter unit 102. An output terminal of the adding unit 105 may be connected to an input terminal if the delay unit 106 and an input terminal of the filter unit 102. The delay unit 106 and the filter unit 102 are also operatively connected to the subtractor 103. An output terminal of the filter unit 102 may be connected to a first input terminal of the subtractor 103. The delay unit 106 may be connected to a second input terminal of the subtractor 103. The subtractor 103 may be operatively connected to a transmitter radio front-end (Fe TX).

In the embodiment of FIG. 1, the filter unit 102 is a controllable filter unit. When the filter unit 102 is controllable, it may be operatively connected to the controller 107. The controller 107 may be adapted to control the filter unit 102.

In the embodiment of FIG. 1, the filter unit 102 is implemented by a first mixer 108, a LP (Low-Pass) filter 109 and a second mixer 110. The first mixer 108 is operatively connected to the adding unit 105, and thus operatively connected to the IFFT unit 101, the controller 107, and the LP filter 109. A first input terminal of the first mixer 108 may be connected to the output terminal of the adding unit 105. A second input terminal of the first mixer 108 may be connected to an output terminal of the controller 107. An output terminal of the first mixer 108 may be connected to an input terminal of the LP filter 109. The second mixer 110 is operatively connected to the LP filter 109, the controller 107, and the subtractor 103. An output terminal of the LP filter 109 may be connected to a first input terminal if the second mixer 110. An output terminal of the controller 107 may be connected to a second input terminal of the second mixer 110. An output terminal of the second mixer 110 may be connected to a first input terminal of the subtractor 103.

The controller 107 may be adapted to control the characteristic of the filter unit 102. For example, in the embodiment shown in FIG. 1, the controller controls the filter parameters of the LP filter 109 based on information about the GSM carrier frequencies. The LP filter parameters may be controlled in dependence on frequencies, for which OFDM sub carriers are disabled. For example, the filter parameters of the LP filter 109 may depend on the number of GSM carrier frequencies within the frequency range, in which OFDM sub carriers are disabled. The more GSM carriers, the wider LP filter is provided. A filter bank (for frequency ranges consisting of 1,2,3, . . . GSM carriers) can be stored in a look up table stored in a memory (not shown). The appropriate filter may be selected from the filter bank in dependence on the number and/or location of the GSM sub carriers. The parameters of the LP filter 109 may also be adapted in dependence on the relative strength of the OFDM and the inband GSM signal. If a GSM signal in the frequency range is much stronger than the OFDM signal output from the IFFT unit 101, the filter unit 102 may be adapted to be a less complex filter. For example, with the same output power, the average PSD (Power Spectral Density) for GSM over 200 kHz should be 25 times higher, which means 14 dB. In the extreme case, the GSM signal might be so much stronger than the OFDM signal that no filtering at all is needed to reduce the interference from the OFDM signal. On the other hand, if the OFDM signal is much stronger than the GSM signal, the filter unit 102 may be adapted to be a more complex filter. Thus, it is ensured that the interference from the signal generating unit 100 is sufficiently attenuated.

In another embodiment, the filter unit 102 is controlled by means of controlling the mixers 108, 110. The mixer frequency is controlled in dependence on the frequency of the GSM carrier frequencies.

The controller 107 is adapted to receive from higher layer signalling, e.g. in broadcast messages, information about frequencies where GSM carriers can be located. If the signal generating unit 100 is included in a base station, the higher layer signalling may be received by the base station from a RNC (Radio Network Controller). The frequencies where the GSM inband carriers may be located may be labelled $f_c^{GSM}$. The center frequency of the OFDM carrier frequency is labelled $f_c^{OFDM}$. When the OFDM signal has been generated, the frequency range for the GSM signals will be located at $\Delta f = f_c^{GSM} - f_c^{OFDM}$ after down-conversion with $f_c^{OFDM}$. The controller 107 may be adapted to map the frequencies where the GSM inband carriers may be located to the delta frequency $\Delta f = f_c^{GSM} - f_c^{OFDM}$ that will be used later. The sub carriers of the OFDM system at frequencies where the GSM carriers may be located are disabled. The sub carriers may be disabled e.g. in a modulator connected to the signal generating unit (not shown). Sub carriers corresponding to the narrowband signal bandwidth (GSM 200 kHz) may be disabled. For all other sub carriers QAM symbols are generated and fed to the equalizer 104. The equalizer may be adapted to amplify certain QAM symbols. The equalizer is adapted to compensate for suppression by the filter unit 102 made on the wanted signal. Depending on the characteristic of the filter, only certain symbols or carriers, which are located closest to the frequencies where the GSM carriers may be located, are suppressed. Thus, the equalizer is adapted to compensate for suppression in dependence on the filter characteristics of the filter unit 102.

In one embodiment, filter unit 102 is a notch filter. A notch filter may e.g. be provided by the filter unit 102 illustrated in FIG. 1 and by setting the filter parameters of LP filter 109 appropriately. The filter parameters may be set to provide a sufficiently narrow filter characteristic to provide a notch filter characteristic. The notch filter may be implemented using digital mixers with a controllable mixer frequency and a fixed LP-filter. The mixer frequency is controlled to be located where the frequency range for the GSM inband carriers are located. The mixer frequency is controllable in dependence on the frequency range for the GSM inband carriers. The location of the frequency range, or specific GSM carrier frequencies, may be obtained from information received from higher layers (e.g. in broadcast messages).

The adding unit 105 is adapted to add a cyclic prefix to the output signal of the IFFT unit 101. The cyclic prefix is also referred to as a guard interval. The output signal of the adding unit 105 is fed to the delay unit 106 as well as to the first mixer 108.

The first mixer 108 down-converts the output signal from the adding unit 105, and thus the GSM carrier frequency, to DC. The output signal from the adding unit 105 is mixed with a signal having the frequency $-\Delta f$. In the complex number plane, the signal is down converted with $\exp(j*2*pi*(-\Delta f))$.

The mixed signal is Low-Pass filtered by LP filter 109.

The output signal from the LP filter 109 is basically a replica of the carrier leakage within the GSM pass band, i.e. the frequency range, wherein OFDM sub carriers are disabled, due to the IFFT processing of the OFDM signal. The LP filtered signal is up-converted by the second mixer 110 to the frequency where the interferer initially was located. The LP filtered signal is mixed, i.e. up converted, with $\Delta f$, or in the complex number $\exp(j*2*pi*\Delta f)$. Then the output signal from the second mixer 110 is provided to the subtractor 103. The subtractor 103 is adapted to subtract the output signal from the second mixer 102, i.e. from the filter unit 102 from the output signal from the delay unit 106. The delay unit 106 is adapted to delay the signal corresponding to the delay of the filter unit 102. The signal after the subtraction, now with a large amount of the carrier leakage within the frequency range removed, may then be fed to the front-end TX part (Fe TX) (not shown). Thus, the interference is filtered out by the filter unit 102 and subtracted by the subtractor 103. Thus interference generated by the IFFT unit 101 will be reduced, wherein the frequency range, in which OFDM sub carriers are disabled, may be narrower than if no filtering is used. Thus, the signal generating unit 100 is more effective than if no filter unit is used.

The LP filter 109 can in some cases be of rather low order. The order of the LP filter 109 may be changed depending on e.g. the power of the interference. In some embodiments, not only the interference within the frequency range, in which sub carriers for the OFDM system is disabled, will be removed and/or affected. Depending on the order of the LP filter 109 and its ability to only pass the GSM inband carriers and not the OFDM carriers, the sub carriers closest to said frequency range may be affected by the subtractor 103 in the subtraction process. However, this is a known process by the signal generating unit 100. Therefore, the effect of the subtraction process on said closest sub carriers can be compensated for by the equalizer 104 before the IFFT processing. The equalizer 104 can be controlled by the controller 107, which has knowledge of the characteristic of the filter unit 102. Thus, the gain of the equalizer 104 for each affected sub carrier may be set by the controller 107. The equalizer 104 may be set to amplify the sub carriers that will be affected with a gain, which is proportional to the inverse of the transfer function of the LP filter 109 for a specific frequency. Mathematically, if sub carrier k is suppressed with $H(f_k)$, where sub carrier k has frequency $f_k$, by the LP filter 109, ideally the equalizer for that frequency should be $E(f_k)=1/(1-H(f_k))$. However, since the interference within the frequency range is dominated by the sub carriers of the wideband system closest to the frequency range, another equalizer value could be used. For instance, the equalizer value could be $E(f_k)=\alpha_k/(1-H(f_k))$, where $\alpha_k$ depends on the distance from $f_k$ to the frequency range. The closer $f_k$ is to the frequency range, the smaller $\alpha_k$ may be. $\alpha_k$ may be derived in advance and is a function of the LP filter parameters used. $\alpha_k$ may e.g. be a value less than 1.

In another embodiment, the signals to be used by the first mixer 108 and the second mixer 110 to down-converting/up-converting can be generated by a signal generator (not shown) instead of controller 107. The signal generator may be controlled by a controller having knowledge of GSM inband carrier frequencies.

In one embodiment the signal generating unit 100 is provided by hardware components. In another embodiment, the signal generating unit 100 is provided by software. The functions of the signal generating unit 100 can be provided by a processor running software therefore.

The signal generating unit 100 may be provided within a transmitter for the OFDM system. The transmitter may e.g. be included in a base station or a mobile terminal, such as a portable or handheld mobile radio communication equipment, a mobile radio terminal, a mobile telephone, a pager, a communicator, an electronic organizer, a smartphone or a computer.

Figure 2:
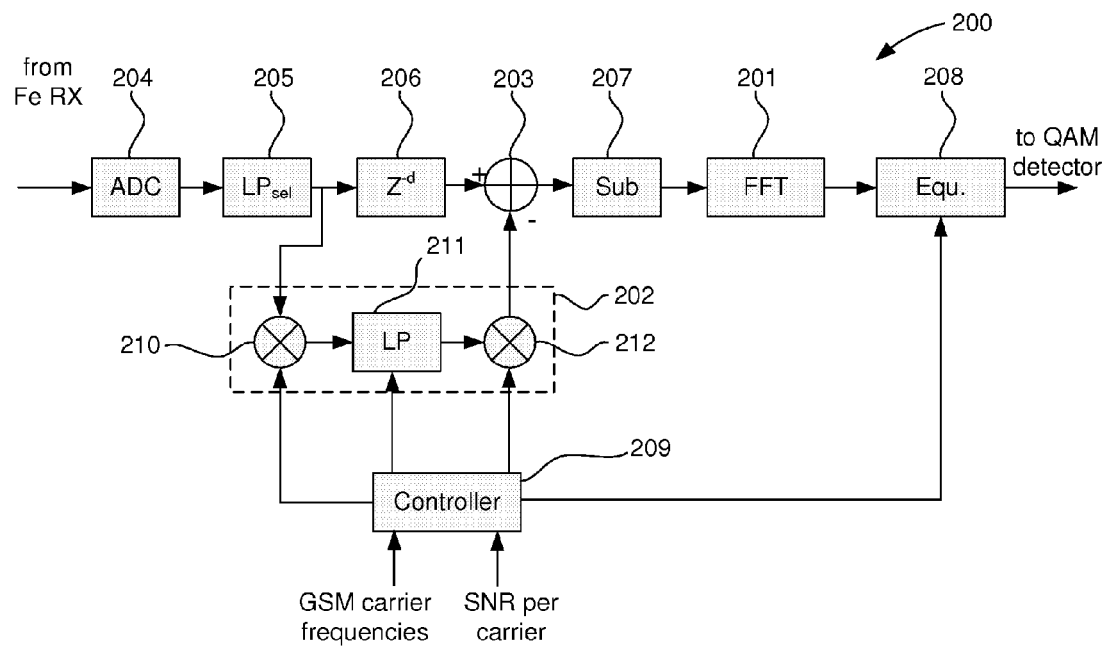
FIG. 2 is block diagram of an embodiment of a signal receiving unit.

FIG. 2 illustrates a signal receiving unit 200. The signal generating unit comprises an FFT (Fast Fourier Transform) unit 201, a filter unit 202, and a subtractor 203. The FFT unit 201 is located after the subtractor 203 in a receiver path of the signal generating unit 200. The signal receiving unit 200 may also comprise an ADC (Analogue to Digital Converter) 204, a LP selectivity filter ($LP_{sel}$) 205, a delay unit ($z^{-d}$) 206, a subtraction unit 207, an equalizer 208, and a controller 209.

Figure 3:
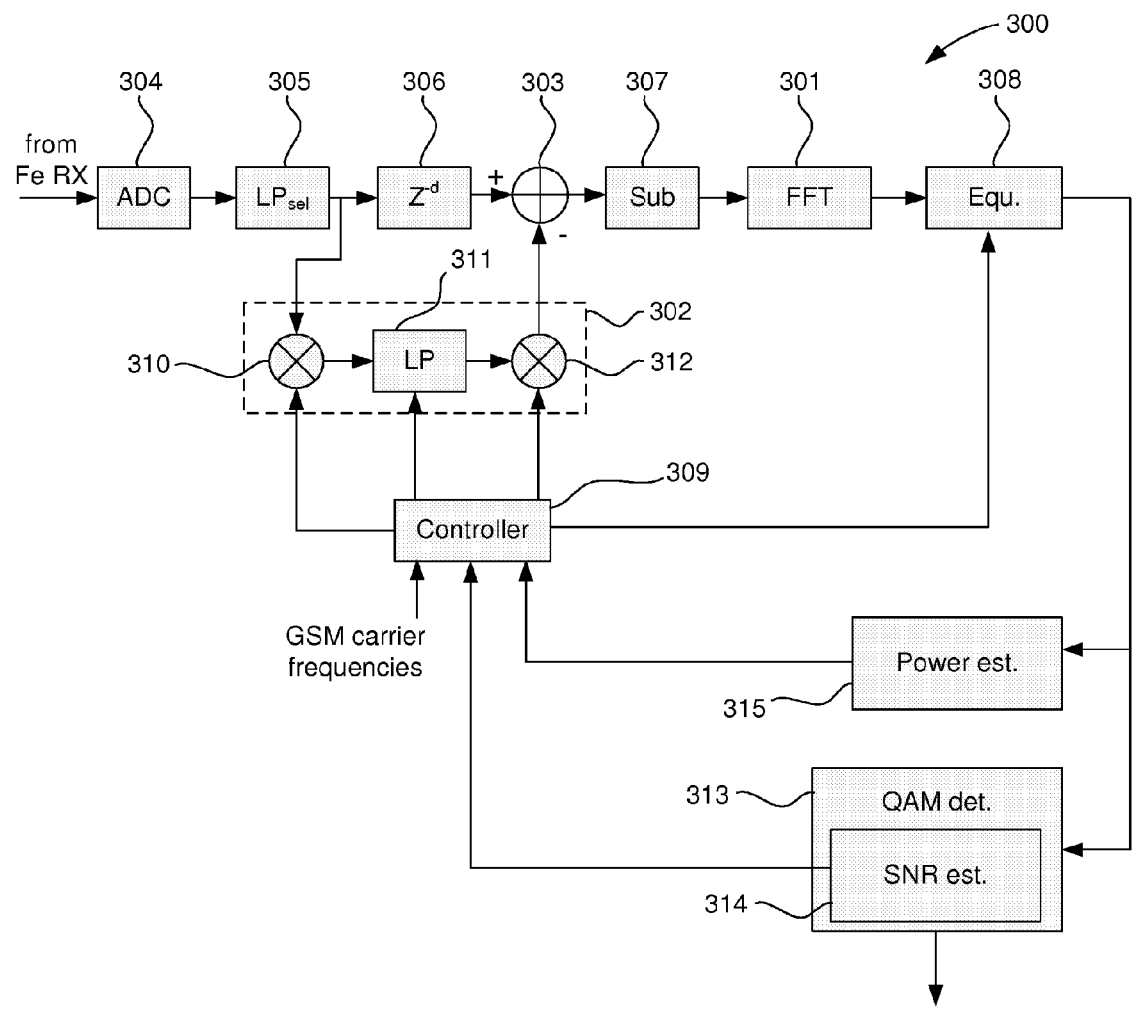
FIG. 3 is a block diagram of an embodiment of a signal receiving unit.

The ADC 204 may be operatively connected to a receiver front-end (Fe RX) and the LP selectivity filter 205. An output terminal of the ADC 204 may be connected to an input terminal of the LP selectivity filter 205. The LP selectivity filter 205 is also operatively connected to the delay unit 206 and the filter unit 202. An output terminal of the LP selectivity filter 205 may be connected to an input terminal of the delay unit 206 and an input terminal of the filter unit 202. The delay unit 206 is operatively connected to the subtractor 203. An output terminal of the delay unit 206 may be connected to a first input terminal of the subtractor 203. The subtractor 203 is operatively connected to the filter unit 202. A second input terminal of the subtractor 203 may be connected to an output terminal of the filter unit 202. The subtractor 203 is operatively connected to a subtracting unit 207. An output terminal of the subtracting unit 207 may be connected to an input terminal of the FFT unit 201. The FFT unit 201 is operatively connected to the subtracting unit 207 and the equalizer 208. Thus, the FFT unit 201 is also operatively connected to the subtractor 203. An output terminal of the FFT unit 201 may be connected to an input terminal of the equalizer 208. The equalizer 208 may be operatively connected to a QAM detector (FIG. 3).

In the embodiment of FIG. 2, the filter unit 202 is a controllable filter unit. The filter unit 202 is operatively connected to the controller 209. Filter unit 202 comprises a first mixer 210, an LP filter 211, and a second mixer 212. The first mixer 210 is operatively connected to the LP selectivity filter 205 and controller 209. A first input terminal of the first mixer 210 may be connected to the output terminal of the LP selectivity filter 205. A second input terminal of the first mixer 210 may be connected to an output terminal of controller 209. LP filter 211 is operatively connected to controller 209, the first mixer 210, and the second mixer 212. A first input terminal of LP filter 211 may be connected to an output terminal of the first mixer 210. A second input terminal of LP filter 211 may be connected to controller 209. An output terminal of LP filter 211 may be connected to a first input terminal of the second mixer 212. The second mixer 212 is operatively connected to controller 209 and the subtractor 203. A second input terminal of the second mixer 212 may be connected to the controller 209. An output terminal of the second mixer 212 may be connected to a second input terminal of the subtractor 203.

In one embodiment, filter unit 202 is a notch filter. A notch filter may e.g. be provided by the filter unit 202 illustrated in FIG. 2 by setting the filter parameters of LP filter 211 appropriately. The filter parameters may be set to provide a sufficiently narrow characteristic to provide a notch filter characteristic. The notch filter may be implemented using digital mixers with a controllable mixer frequency and a LP-filter having a fixed characteristic according to the principles described for filter unit 102. For controlling the filter unit 202, the mixer frequency may be controlled to be located where the frequency range for the GSM carriers are located. The mixer frequency may be controllable in dependence on the frequency range for the GSM inband carriers. The location of the frequency range, or specific GSM carrier frequencies, may obtained from information received from higher layers (e.g. in broadcast messages).

In one embodiment, LP filter 211 is controllable to control the filter unit 202. For example, the filter parameters of LP filter 211 may depend on the number of GSM carrier frequencies within the frequency range, in which OFDM sub carriers are disabled, according to the same principles as described for LP filter 109.

The following description of the signal receiving unit 200 is based on that only one frequency range having a bandwidth equal to the GSM signal bandwidth exist in the OFDM spectrum. However, the invention is not limited to that case. Any number of frequency ranges may be used in the OFDM frequency spectrum.

A received signal is down-converted to a baseband signal in the front-end receiver (not shown). The received down-converted signal is then fed to the ADC 204, which samples and quantizes the signal. The output signal from the ADC 204 is LP filtered by the LP selectivity filter 205 ($LP_{sel}$). The LP selectivity filter 205 is adapted to pass the OFDM signal. If the GSM inband interferes are located within the OFDM frequency spectrum, they will also pass through the LP selectivity filter 205. The signal is then fed to the delay unit 206. Also, the signal is fed to the first mixer 210. The first mixer 210 is adapted to down-convert the output signal from the LP selectivity filter 205 according to the same principles as mixer 108. The output signal from the LP selectivity filter 205 is mixed such that the carrier frequency of the GSM interferer located at the frequency range is moved to DC.

The output signal from the first mixer 210 is then fed to LP filter 211. The LP filter 211 is adapted to pass the GSM inband interferer. Thus, the output signal from LP filter 211 is basically a replica of the GSM inband interferer. The second mixer 212 is adapted to up-convert the LP filtered signal from LP filter 211 to a frequency corresponding to a centre frequency of the GSM inband frequency, i.e. the frequency range wherein the OFDM sub carriers are disabled, according to the principles as described with regard to mixer 110. The subtractor 203 is adapted to subtract the output signal of the second mixer 212 from the output signal from delay unit 206. The delay unit 206 is adapted to delay the output signal from the LP selectivity filter 205 corresponding to the current delay of the filter unit 202. Consequently, the interference caused by a GSM inband interferer located at the frequency range, in which OFDM sub carriers are disabled, is subtracted from the received signal. If the received signal includes a cyclic prefix, it is removed from the received signal by the subtracting unit 207. The output signal from the subtracting unit 207 is then fed to the FFT unit 201. After FFT processing, the signal is equalized and fed to the QAM detector.

Information about the location of GSM carrier frequencies within the frequency range may be received by controller 209 from higher layer signalling and thus be known to the signal receiving unit 200. The location of the GSM carriers may e.g. be provided in broadcast messages transmitted via higher layer signalling.

Controller 209 may be adapted to control the mixer frequency of the first mixer 210 and the second mixer 212, according to the same principles as controller 107 controls the mixer frequency of mixer 108 and 110. Also, controller 209 may be adapted to control parameters of LP filter 211 and/or of equalizer 208.

Equalizer 208 works in a similar way as the equalizer 104, i.e. to restore known, in this case, receiver distortions of the wanted sub carriers. Distortions made by the filter unit 202 are known. Thus, equalizer 208 may compensate for distortions made by filter unit 202.

In another embodiment, the signals to be used by the first mixer 210 and the second mixer 212 for down-converting/up-converting can be generated by a signal generator (not shown) instead of controller 209. The signal generator may be controlled by a controller having knowledge of the location of GSM inband carrier frequencies.

FIG. 3 illustrates an embodiment of the signal receiving unit 300. Units of the embodiment of FIG. 3 having reference numerals similar to FIG. 2 have the same or similar function if not otherwise described below. In one embodiment of FIG. 3, a QAM detector 313 is adapted to obtain carriers within the frequency band. The QAM detector 313 comprises an SNR estimator 314. The SNR estimator 314 is adapted to generate an SNR value for each obtained carrier or a subset of the obtained carriers. The SNR value per carrier may be supplied to controller 309. The filter unit 302 is in this embodiment controllable in dependence on any generated SNR value per carrier.

The QAM detector 313 is adapted to obtain carriers within the frequency band of the wideband system. The SNR estimator 314 is adapted to generate an SNR value for each carrier obtained by the QAM detector 313, wherein the controllable filter unit is controllable in dependence on any generated SNR value.

In one embodiment, the filter parameters for LP filter 211 are a function of the bandwidth of the frequency range, in which the OFDM sub carriers are disabled. Alternatively or additionally, the filter parameters of LP filter 211 are a function of the SNR (Signal to Noise Ratio) per OFDM carrier obtained by the QAM detector. A wider LP filter is needed if the GSM inband interferer is large. An estimate of strength of the GSM inband interferer could be generated by measuring the SNR per OFDM carrier. Also, the signal power integrated over the hole after the FFT processing could be used as a measure of the strength of the GSM interferer. The integrated signal power may be fed back to controller 209 and used to control the filter parameters of LP filter 210.

The signal receiving unit of FIG. 3 also comprises a signal power estimator 315. The signal integrator is adapted to integrate the signal power over the frequency range, in which OFDM sub carriers are disabled. The integrated signal power may be supplied to the controller 309. The controller 309 can control the controllable filter unit 302 in dependence on the integrated signal power. The controllable filter unit may be controlled by controlling the cut-off frequency of the of the filter unit 302. The higher integrated signal power in the frequency range where the OFDM subcarriers are disabled, the higher cut-off frequency of the filter unit 302 (i.e. cut-off frequency of the LP filter 311) may be provided.

The controller may also control filter parameters of the controllable filter unit 302 as have been described in relation to FIG. 2.

In another embodiment, only one of the SNR value for obtained carriers and the integrated signal power is used to control the filter unit.

In one embodiment the signal receiving unit illustrated in FIGS. 1 and 2 is provided by hardware components. In another embodiment, the signal receiving unit is provided by software. The signal generating unit can be provided by a processor running software to provide its functions. The components involved in the processing according to the invention do not include the ADC 204, 304 and the LP selectivity filter 205, 305, which are shown for illustrative purposes, in all embodiments. Thus, all processing in the signal receiving unit 200, 300 may be made in the digital domain. Consequently, the functions of the units of the signal receiving unit 200, 300 may be provided by a processor running software therefore.

The equalizer 104 can be controlled by controller 107 based on the same parameters as the filter unit 102. Similarly, equalizer 208 and 308 may be controlled based on the same parameters as filter unit 202 and 302.

The signal receiving unit 200, 300 may be provided within a receiver for the OFDM system. The receiver may e.g. be included in a base station or a mobile terminal, such as a portable or handheld mobile radio communication equipment, a mobile radio terminal, a mobile telephone, a pager, a communicator, an electronic organizer, a smartphone or a computer.

Figure 4:
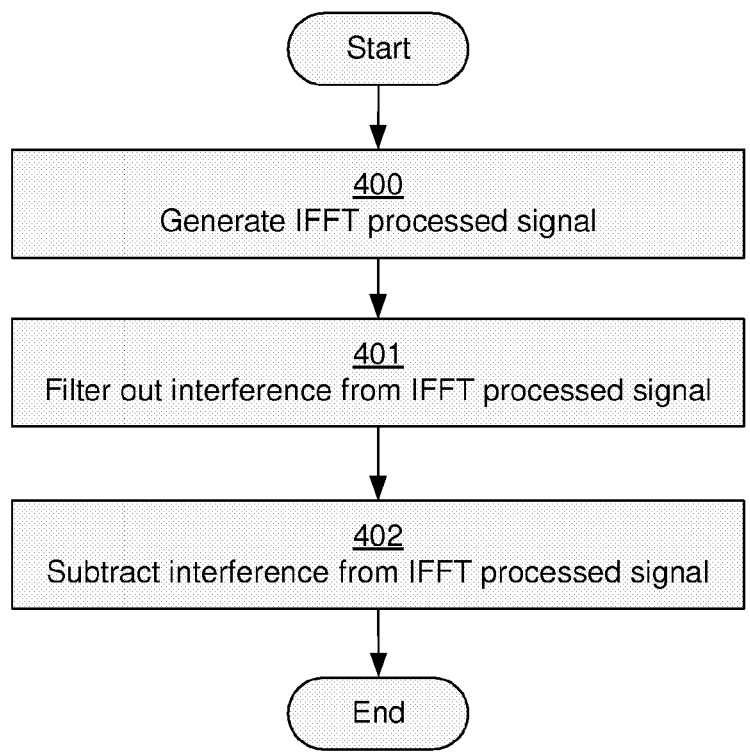
FIG. 4 is a flow chart of a method for generating signals.

FIG. 4 illustrates an embodiment of a method for generating signals. In a first step 400, an IFFT processed signal is generated. In step 401, the IFFT processed signal is filtered, as described above, to filter out interference. The filtering may include controlling the filtering process, e.g. in dependence on allocated carrier frequencies in the frequency range by the GSM system, relative signal strength, number of carrier frequencies for the GSM system, etc., as described above. The filtering may also comprise down-converting the IFFT processed output signal, LP filtering the down-converted signal and up-converting the LP filter signal, as described above. In step 402, the interference filtered out is subtracted from the IFFT processed output signal. Then, the procedure is ended.

Figure 5:
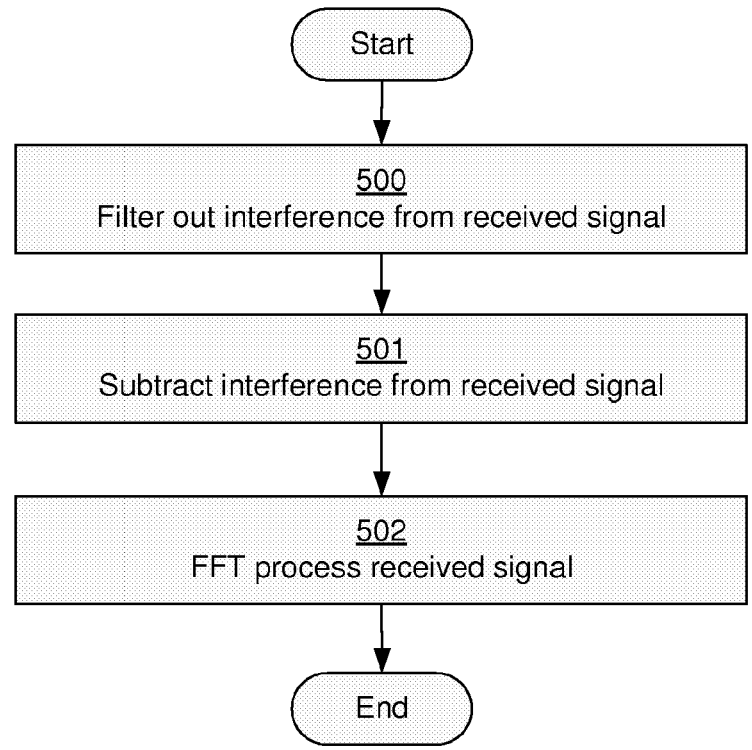
FIG. 5 is a flow chart of a method for receiving signals.

FIG. 5 illustrates an embodiment of a method for receiving signals. In a first step 500, a received signal is filtered to filter out interference, as described above. The filtering may comprise controlling the filtering, e.g. in dependence on GSM carrier frequencies, bandwidth of the frequency range for the GSM carriers, SNR value generated for obtained carriers, integrated signal power over the frequency range for the GSM carriers, etc., as described above. In step 501, the interference is subtracted from the received signal. In step 502, the received signal is FFT processed after the interference has been subtracted. Then, the procedure is ended.

The invention may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

Simulations of the signal generating unit has been made with a 5 MHz OFDM signal having 16 disabled subcarriers corresponding to 200 kHz at [−100,100] kHz. The spectral leakage was reduced close to 15 dB with a filter unit compared to the prior art solution without any filter unit.

Simulations of the signal receiving unit has also been made with the SNR per carrier in case of 5 MHz OFDM (−80 dBm/5 MHz in to antenna) and one GSM carrier (−70 dBm/200 kHz into antenna located at baseband frequency 0 Hz). Ideal SNR should be 20 dB (7 dB noise factor assumed in the radio). In the prior art solution without any filter unit almost all carriers are affected by the GSM interferer due to the FFT spectral leakage, while for the case with the filter unit only the 8 carriers closest to the GSM carrier was affected.

The embodiments of the invention allows for reduction of interference at a frequency range, in which carriers for a broad-band communication system are disabled. Thus, it is possible to make the frequency range for a narrowband system within a frequency band for a wideband system narrower without causing interference between the systems. Consequently, the signal generating unit and the signal receiving unit will be more efficient, as the frequency utilization will be increased. With increased frequency utilization, the transmission rate of the broadband system may be increased.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A signal generator for generating signals within a predetermined frequency band of a first communication system, comprising:
an inverse Fast Fourier Transform (IFFT) unit for generating an output signal;
a filter operatively connected to the IFFT unit, the filter being configured to filter out, from the output signal, interference located at at least one frequency range, wherein the filter comprises a first mixer operatively connected to the IFFT unit, a lowpass (LP) filter operatively connected to the first mixer, and a second mixer operatively connected to the LP filter; the first mixer is configured to down-convert the output signal, which has a certain frequency, to DC (Direct Current); the LP filter is configured to LP filter the down-converted output signal; and the second mixer is configured to up-convert the LP filtered signal to the certain frequency; and
a subtractor operatively connected to the IFFT unit and to the filter, the subtractor being configured to subtract the interference from the output signal;
wherein the signal generator is configured to at least temporarily disable carrier frequencies within the at least one frequency range, which is located within the predetermined frequency band and which is provided for a second communication system; the filter is controllable based on carrier frequencies allocated in the frequency range by the second communication system.

2. The signal generator of claim 1, wherein the filter is controllable based on relative strengths of signals generated by the signal generator and signals generated by the second communication system within the frequency range.

3. The signal generator of claim 1, wherein the filter is controllable based on a number of carrier frequencies for the second communication system within the frequency range.

4. The signal generator of claim 1, further comprising an equalizer operatively connected to the IFFT unit, wherein the equalizer is adapted to amplify certain frequencies of signals generated by the signal generator which are affected by the filter.

5. The signal generator of claim 1, further comprising a signal receiver for receiving signals within the predetermined frequency band, the signal receiver comprising:
a receiver filter adapted to filter out interference located at the frequency range from a received signal;
a receiver subtractor operatively connected to the filter, the receiver subtractor being adapted to subtract the interference from the received signal; and
a Fast Fourier Transform (FFT) unit operatively connected to the receiver subtractor and located after the subtractor in a receiver path of the signal receiver.

6. A signal receiver for receiving signals within a predetermined frequency band of a first communication system, the frequency band including a frequency range, in which carrier frequencies for the first communication system are at least temporarily disabled, which is located within the predetermined frequency band, and which is provided for a second communication system, comprising:
a filter configured to filter out, from a received signal, interference located at the frequency range; wherein the filter is controllable based on carrier frequencies allocated in the frequency range by the second communication system;
a subtractor operatively connected to the filter unit, the subtractor being configured to subtract the interference from the received signal; and
a Fast Fourier Transform (FFT) unit operatively connected to the subtractor and located after the subtractor in a receiver path of the signal receiver;
wherein the filter comprises a first mixer operatively connected to receive the received signal, a lowpass (LP) filter operatively connected to the first mixer, and a second mixer operatively connected to the LP filter; the first mixer is configured to down-convert the received signal, which has a certain frequency, to DC (Direct Current); the LP filter is configured to LP filter the down-converted received signal; and the second mixer is configured to up-convert the LP filtered signal to the certain frequency.

7. The signal receiver of claim 6, wherein the filter is controllable based on a bandwidth of the frequency range.

8. The signal receiver of claim 6, further comprising a quadrature amplitude modulation (QAM) detector adapted to obtain carriers within the frequency band, and a signal-to-noise ratio (SNR) estimator adapted to generate an SNR value for each obtained carrier, wherein the filter is controllable based on a generated SNR value.

9. The signal receiver of claim 6, further comprising a signal power estimator adapted to integrate a signal power over the frequency range, wherein the filter is controllable based on the integrated signal power.

10. The signal receiver of claim 6, further comprising a signal generator for generating signals within the predetermined frequency band of a first communication system, wherein the signal generator is adapted to at least temporarily disable carrier frequencies within at least one frequency range, which is located within the predetermined frequency band and which is provided for the second communication system; and the signal generator comprises: an inverse Fast Fourier Transform (IFFT) unit for generating an output signal; a transmitter filter operatively connected to the IFFT unit and adapted to filter out, from the output signal interference located at the frequency range; and a transmitter subtractor operatively connected to the IFFT unit and to the transmitter filter, and adapted to subtract the interference from the output signal.

11. A method of generating signals within a predetermined frequency band of a first communication system, wherein the predetermined frequency band includes disabled carrier frequencies within at least one frequency range located within the predetermined frequency band and provided for a second communication system, comprising:
generating, in a signal generator, an inverse Fast Fourier Transform (IFFT) processed output signal;
filtering the IFFT processed output signal to filter out interference located at the frequency range;
subtracting the interference from the IFFT processed output signal; and
controlling the filtering based on carrier frequencies allocated in the frequency range by the second communication system;
wherein the filtering comprises down-converting the IFFT processed output signal, which has a certain frequency, to DC; low-pass (LP) filtering the down-converted IFFT processed output signal; and up-converting the LP-filtered signal to the certain frequency.

12. The method of claim 11, wherein the filtering is controlled based on relative strengths of signals generated in the predetermined frequency band and signals generated within the frequency range.

13. The method of claim 11, wherein the filtering is controlled based on a number of carrier frequencies for the second communication system within the frequency range.

14. The method of claim 11, further comprising amplifying selected signals to be IFFT processed that will be affected by the filtering.

15. A method of receiving signals within a predetermined frequency band of a first communication system, the frequency band including a frequency range for a second communication system, and carrier frequencies for the first communication system being located within the predetermined frequency band are at least temporarily disabled, comprising:
   filtering out, from a received signal in a receiver, interference located at the frequency range;
   subtracting the interference from the received signal;
   Fast Fourier Transform (FFT) processing the received signal after the interference has been subtracted; and
   controlling the filtering based on carrier frequencies allocated in the frequency range by the second communication system;
   wherein the filtering comprises down-converting the received signal, which has a certain frequency, to DC (Direct Current); low-pass (LP) filtering the down-converted signal; and up-converting the LP-filtered signal to the certain frequency.

16. The method of claim 15, wherein the filtering is controlled based on a bandwidth of the frequency range.

17. The method of claim 15, further comprising obtaining carriers within the frequency band, and generating a signal-to-noise ratio (SNR) value for each obtained carrier, wherein the filtering is controlled based on a generated SNR value.

18. The method of claim 15, further comprising integrating a signal power over the frequency range, wherein the filtering is controlled based on the integrated signal power.

19. A non-transitory computer-readable medium having stored thereon instructions that, when executed, cause the computer to perform a method of generating signals within a predetermined frequency band of a first communication system, the predetermined frequency band including disabled carrier frequencies within at least one frequency range located within the predetermined frequency band and provided for a second communication system, wherein the method comprises:
   generating an inverse Fast Fourier Transform (IFFT) processed output signal;
   filtering the IFFT processed output signal to filter out interference located at the frequency range;
   subtracting the interference from the IFFT processed output signal; and
   controlling the filtering based on carrier frequencies allocated in the frequency range by the second communication system;
   wherein the filtering comprises down-converting the IFFT processed output signal, which has a certain frequency, to DC (Direct Current); low-pass (LP) filtering the down-converted IFFT processed output signal; and up-converting the LP-filtered signal to the certain frequency.

20. A non-transitory computer-readable medium having stored thereon instructions that, when executed, cause the computer to perform a method of receiving signals within a predetermined frequency band of a first communication system, the frequency band including a frequency range for a second communication system, and carrier frequencies for the first communication system being located within the predetermined frequency band are at least temporarily disabled, wherein the method comprises:
   filtering out, from a received signal, interference located at the frequency range;
   subtracting the interference from the received signal;
   Fast Fourier Transform (FFT) processing the received signal after the interference has been subtracted; and
   controlling the filtering based on carrier frequencies allocated in the frequency range by the second communication system;
   wherein the filtering comprises down-converting the received signal, which has a certain frequency, to DC (Direct Current); low-pass (LP) filtering the down-converted signal; and up-converting the LP-filtered signal to the certain frequency.

* * * * *

UNITED STATES PATENT AND TRADEMARK OFFICE
CERTIFICATE OF CORRECTION

| | |
|---|---|
| PATENT NO. | : 8,081,561 B2 |
| APPLICATION NO. | : 12/096606 |
| DATED | : December 20, 2011 |
| INVENTOR(S) | : Lindoff et al. |

It is certified that error appears in the above-identified patent and that said Letters Patent is hereby corrected as shown below:

ON THE TITLE PAGE:

Item (56), under "OTHER PUBLICATIONS", in Column 2, Line 4, delete "Interferance" and insert -- Interference --, therefor.

IN THE SPECIFICATIONS:

In Column 8, Line 34, delete "$\alpha_k$ may be. $\alpha_k$" and insert -- $\alpha_k$ --, therefor.

Signed and Sealed this
Nineteenth Day of June, 2012

David J. Kappos
*Director of the United States Patent and Trademark Office*